United States Patent
McLain et al.

(10) Patent No.: US 7,280,035 B2
(45) Date of Patent: Oct. 9, 2007

(54) DOOR SWING DETECTION AND PROTECTION

(75) Inventors: Kurt D. McLain, Ortonville, MI (US); Michael A. Kropinski, Troy, MI (US)

(73) Assignee: General Motors Corporation, Detroit, MI (US)

( * ) Notice: Subject to any disclaimer, the term of this patent is extended or adjusted under 35 U.S.C. 154(b) by 218 days.

(21) Appl. No.: 10/873,926

(22) Filed: Jun. 22, 2004

(65) Prior Publication Data

US 2005/0280284 A1    Dec. 22, 2005

(51) Int. Cl.
*B60Q 1/00* (2006.01)
*B60J 5/00* (2006.01)

(52) U.S. Cl. ................... 340/435; 340/436
(58) Field of Classification Search ......... 340/435, 340/903, 436; 49/26–28, 31; 296/246.4, 296/146.4
See application file for complete search history.

(56) References Cited

U.S. PATENT DOCUMENTS

| | | | | |
|---|---|---|---|---|
| 2,079,054 A * | 5/1937 | Etienne | ............ | 188/82.3 |
| 4,458,446 A * | 7/1984 | Mochida et al. | ............ | 49/28 |
| 5,235,316 A * | 8/1993 | Qualizza | ............ | 340/436 |
| 6,362,735 B2 * | 3/2002 | Sicuranza | ............ | 340/556 |
| 6,676,186 B2 * | 1/2004 | Greif | ............ | 296/50 |
| 6,819,262 B2 * | 11/2004 | Moser et al. | ............ | 340/932.2 |
| 6,924,735 B2 * | 8/2005 | Ueda et al. | ............ | 340/426.28 |
| 2005/0085972 A1 * | 4/2005 | Martinez | ............ | 701/49 |
| 2005/0242618 A1 * | 11/2005 | Menard | ............ | 296/146.4 |
| 2005/0280518 A1 * | 12/2005 | Bartels et al. | ............ | 340/435 |

FOREIGN PATENT DOCUMENTS

| | | | |
|---|---|---|---|
| DE | 19537619 A1 * | 4/1997 |
| DE | 19836310 A1 * | 3/2000 |
| DE | 10229033 A1 * | 1/2004 |
| JP | 63046918 A * | 9/1986 |
| JP | 2003104055 A * | 4/2003 |

* cited by examiner

*Primary Examiner*—Jeffery Hofsass
*Assistant Examiner*—Anne V Lai

(57) ABSTRACT

Methods and apparatus are provided for reducing the occurrence of vehicle door bumps against an adjacent object facing the door. The apparatus comprises one or more distance sensors mounted on the vehicle for measuring distance D from the door to the object, a brake for inhibiting outward movement of the door toward the object, a warning system and a controller coupled to the distance sensors, warning system and brake for applying the brake to inhibit further outward movement of the door when $D \leq D(MIN)$, a predetermined minimum distance away from the object. In a preferred embodiment, a first driver warning is activated when the initial door-to-object spacing $D(INIT) \leq D(SAFE)$, the maximum outward door reach. A second warning is desirably added when the door begins moving toward the object or has reached about $(D(INIT))/2$ and a third warning is activated when the brake is engaged.

1 Claim, 4 Drawing Sheets

DOOR SWING DETECTION AND PROTECTION

TECHNICAL FIELD

The present invention generally relates to an apparatus and method for protecting doors, and more particularly to an apparatus and method for reducing risk of a vehicle door striking a nearby object when opened.

BACKGROUND

When a vehicle is along side another vehicle or object there is always the risk that if the vehicle door is opened it may bump the adjacent object or vehicle, thereby causing damage to one or both. It is common to apply edge guards to vehicle doors to reduce the severity of such bumps. However, this does not prevent the bump but merely cushion it so that it is less likely to cause damage. Nonetheless, even with the use of door edge guards, damage to the user's vehicle or to the other vehicle or object can still result. The cost of repairing such damage is significant.

Accordingly, it is desirable to provide an apparatus and method whereby the vehicle user is warned that his or her door is undesirably close to a nearby vehicle or object. In addition, it is desirable to provide a graduated warning depending upon the likelihood of his or her door contacting the nearby vehicle or object. Still further it is desirable that when impact is imminent, that door movement be inhibited so as to further reduce the likelihood of impact. Other desirable features and characteristics of the present invention will become apparent from the subsequent detailed description and the appended claims, taken in conjunction with the accompanying drawings and the foregoing technical field and background.

BRIEF SUMMARY

An apparatus is provided for reducing the occurrence of vehicle door bumps against an adjacent object facing the door. The apparatus comprises one or more distance sensors mounted on the vehicle for measuring distance D from the door to the object, a brake for inhibiting the outward movement of the door toward the object, and a controller coupled to the distance sensors and the brake for applying the brake to inhibit further outward movement of the door when D<D(MIN), a predetermined minimum distance away from the object. In a preferred embodiment the controller activates a first driver warning when the initial door-to-object spacing D(INIT)<D(SAFE), the maximum outward door reach absent the object. A second warning is desirably added when the door begins moving toward the object or has reached about (D(INIT))/2 and a third warning is added when the D reaches ~D(MIN) and the brake is activated. The warning system desirable includes both audible and visual alarms.

A method is provided for reducing the likelihood of a bump between a vehicle door and an adjacent object facing the door. The method comprises, measuring distance D between the door and the object, comparing D(INIT) to D(SAFE) where D(INIT) is the distance to the object before the door is opened and D(SAFE) is a distance from the vehicle reached by the door at its maximum possible outward movement absent the object, and determining whether the door is moving toward the object, and if so turning on a warning. Preferably, the method further comprises determining when the distance D<D(MIN) where D(MIN) is a predetermined minimum value, and then engaging a brake to inhibit further outward movement of the door. In a further embodiment, a further warning is turned on before or after the engaging step.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The suffix "(s)" is used herein to indicate that there are one or more of the particular objects or functions being discussed, depending upon the circumstances. For example and not intended to be limiting, the word "sensor(s)" indicates that there are one or more sensors, "warning(s)" indicates that there are one or more warnings, and so forth. Further, as used herein, the word "driver" is intended to include any door user in the vehicle and not be limited merely to the person behind the steering wheel.

Figure 1:
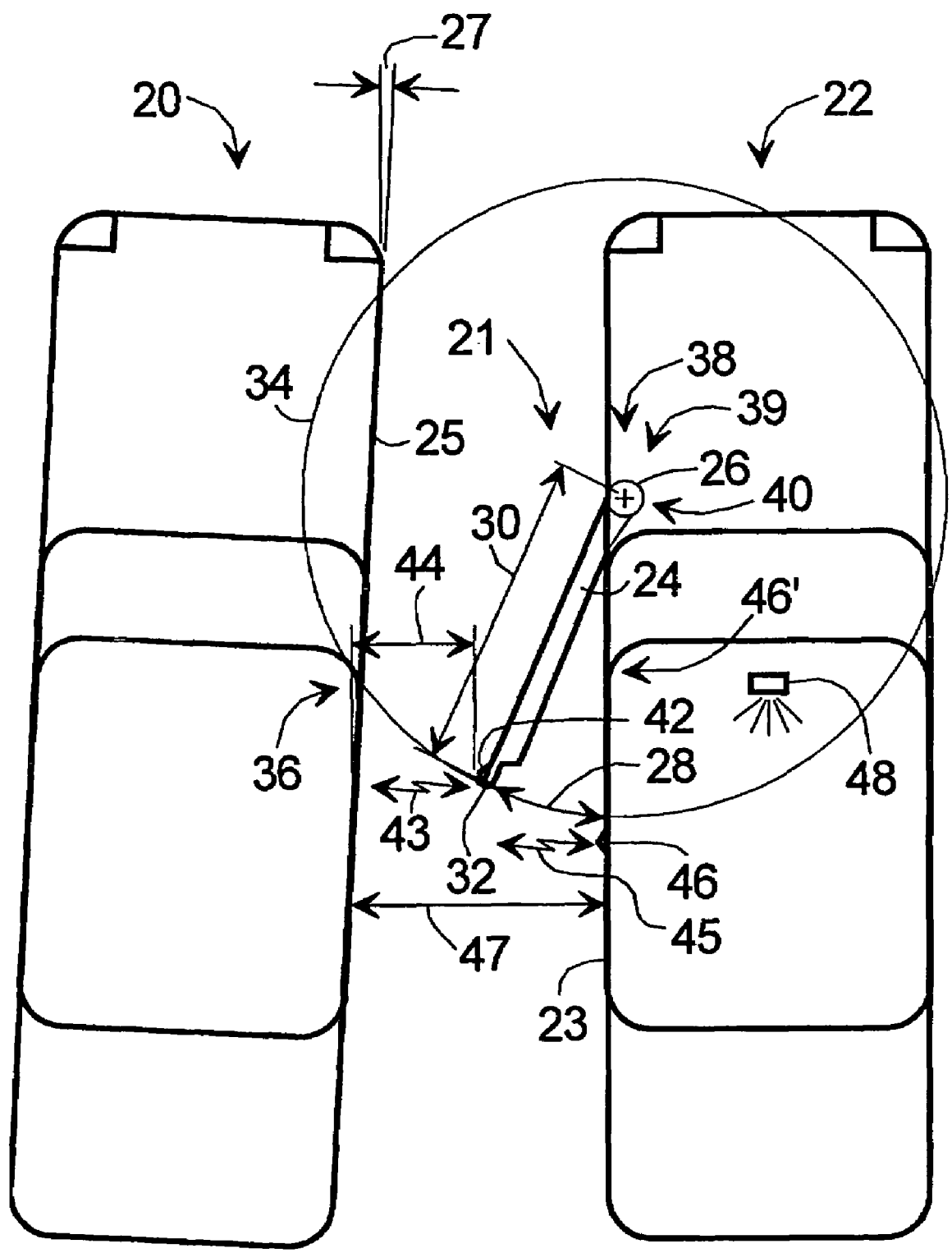
FIG. 1 is a simplified drawing of two adjacent vehicles, illustrating a door swing detection and protection system according to the present invention.

FIG. 1 is a simplified drawing of adjacent vehicles 20, 22, illustrating door swing detection and protection system 21 mounted on vehicle 22, according to the present invention. Vehicle 22 has door 24 that pivots around door hinge 26 by angle 28 and with radial extent 30. Distal door edge 32 follows a path along circle 34 where, unless prevented, it will strike car 20 at location 36. As will be subsequently explained in more detail, conveniently associated with or close to hinge 26 are door angle measuring unit 38 and door brake 40. In the preferred embodiment door 24 has a sensor 42 mounted at or near distal door edge 32 for measuring distance 44 between distal door edge 32 and vehicle 20. Sensor 42 is preferably a type that uses radiative signals and echoes 43 to measure distance 44. However, this is not essential and any type of proximity sensor able to detect the change in position of door edge 32 with respect to vehicle 20 may be used. The same applies to sensor 46. Similar sensor 46 is conveniently but not essentially mounted on body 23 of vehicle 22 rather than on door 24, for measuring separation distance 47 using radiative signals and echoes 45. Sensor 46 may be used in place of or in addition to sensor 42. Signals 43, 45 may be electromagnetic or acoustic or a combination thereof.

Warning system 48 is desirable provided within vehicle 22 to alert the vehicle user (hereafter the "driver") that there is a danger of door 24 striking vehicle 20. While object 20 is identified as a vehicle, this is merely for convenience of description and not intended to be limiting. Vehicle 20 represents any type of nearby object that door 24 might strike when opened. While sensors 42 and 46 are shown in FIG. 1 as protruding slightly from vehicle 22, this is merely for convenience of illustration. It is desirable that sensors 42, 36 be recessed and not significantly protrude from the surface of vehicle 22. In this way they are less likely to be damaged by door strikes or other familiar driving and parking mishaps. A protective cover substantially transparent to signals 43, 45 being emitted and received by sensors 42, 46 may also be used.

Figure 2:
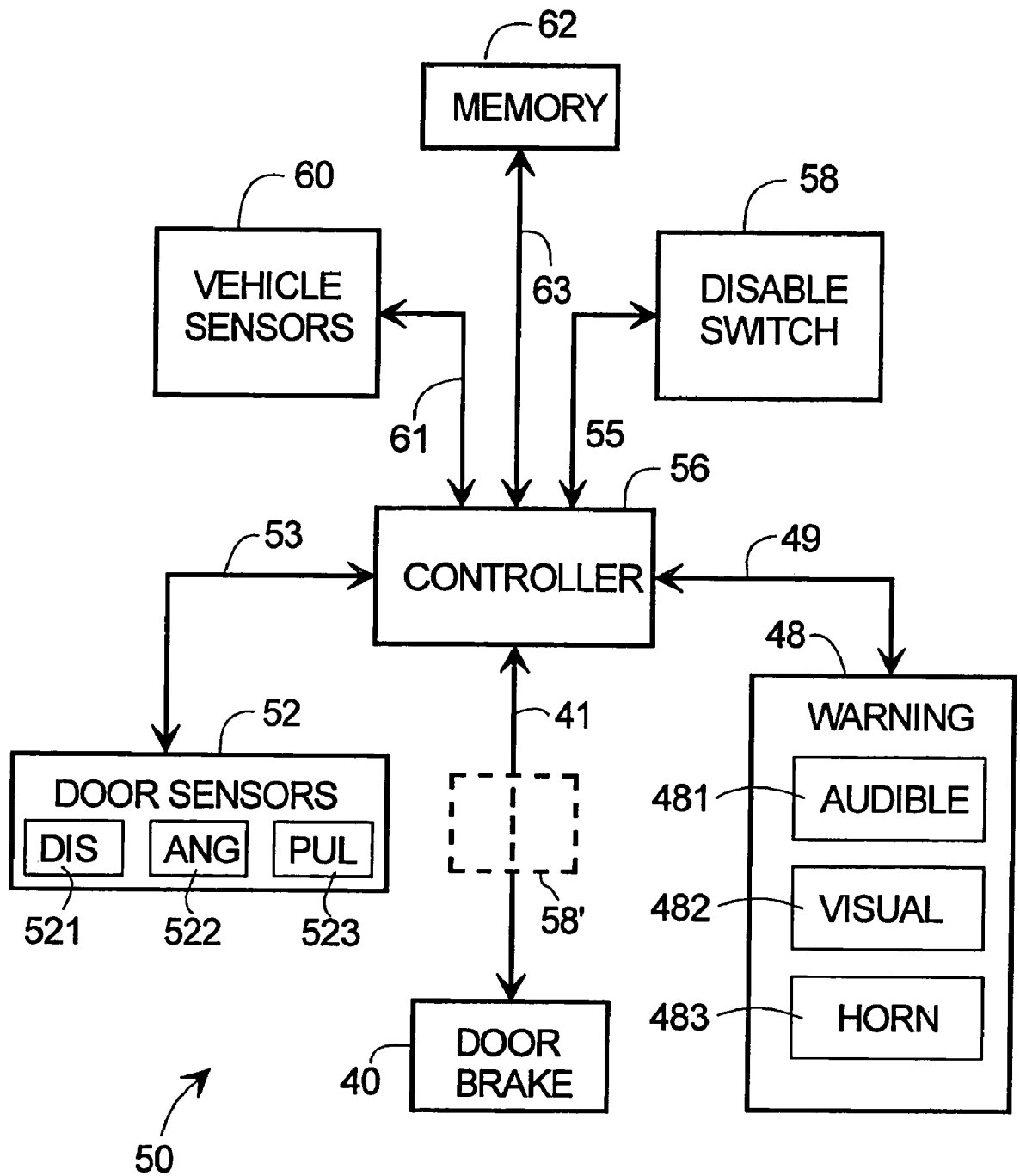
FIG. 2 is a simplified electrical schematic diagram of the system of the present invention.

FIG. 2 is a simplified electrical schematic diagram of control system 50 according to the present invention. System 50 comprises door system sensor(s) 52 including door distance sensor(s) 521 (abbreviated as "DIS"), optional door angle sensor(s) 522 (abbreviated as "ANG"), and optional door pull sensor(s) 523 (abbreviated PUL). Distance sensor(s) 521 can include either or both of door-mounted sensor 42 and/or body-mounted sensor 46. Door angle sensor(s) 522 can include angle sensor 38 of FIG. 1. Door pull sensor(s) 523 can include door pull sensor 39 of FIG. 1. The purpose of distance sensor(s) 521 is to measure the distance D from door edge 32 to vehicle or object 20 of FIG. 1. The purpose of angle sensor 522 is to measure angle 28 of FIG. 1. The purpose of sensor 523 is to measure whether an inward (e.g., a "pull") or outward directed (e.g., a "push") force or torque is being exerted on door 24 by the driver. For example, being able to detect an inward directed force or torque being applied to door 24 is useful in deciding when to release door brake 40. Distance, angle sensors and torque sensors are well known in the art.

System 50 also comprises controller 56 coupled to sensor(s) 52 by leads or bus 53, warning system 48 (abbreviated as "WARNING") coupled to controller 56 by leads or bus 49, door brake 40 coupled to controller 56 by leads or bus 41, disable switch 58, memory 62 coupled to controller 56 by leads or bus 63, vehicle sensor(s) 60 coupled to controller 56 by leads or bus 61. Sensor(s) 60 are useful for determining whether vehicle 22 is in motion or stopped and may be a part of the vehicle's drive-train control system or other vehicle electronics system. Disable switch 58 can be coupled to controller 56 by leads or bus 55 or coupled between door brake 40 and controller 56 as shown by the dashed outline 58' in lead or bus 41. Either arrangement is suitable. Disable switch 58, 58' permits the user to temporarily shut-off or inhibit operation of door guard system 21, 50. This can be done by temporarily disabling controller 56 through lead or bus 55 or by preventing "brake door" signals from activating brake 40 by interrupting lead or bus 41. In the latter mode, the disable switch is located between controller 56 and door brake 40 as shown by dashed outline 58'. In this situation, system 50 would continue to provide the various user warnings discussed below but the door brake would not engage to prevent door 24 from bumping nearby object 20. Warning system 48 desirably includes audible warning unit 481, visual warning unit 482 and access to horn 483. While both audible warning unit 481 and visual warning unit 482 are desirable, both are not necessary and one type of warning be used can alert the driver of vehicle 22 to the risk of a door bump.

Distance D between door edge 32 and adjacent vehicle or object 20 (identified by reference number 44) can be measured directly by sensor 42 either alone or in cooperation with the controller 56. Alternatively, distance D can be approximately calculated by using sensor 46 alone or in cooperation with controller 56 to measure distance 47 and using angle sensor 38 to determine door angle 28. Knowing distance 47, door radius 30 and door angle 28, controller 56 can approximately calculate distance D from door edge 32 to adjacent vehicle or object 20. While useful, this approach is less accurate than using sensor 42 directly, since it is affect by angle 27 by which side 25 of vehicle of object 20 is not substantially parallel to vehicle 22. The greater angle 27, the larger the potential error. In FIG. 1, sensor 46 is shown as being located to the rear of door 24, but this is merely to avoid an excess of crowded lines in the figure. Locating sensor 46 on vehicle body 23 longitudinally about where the midpoint of door radius 30 would be found (e.g., about at location 46') reduces the potential error due to vehicle or object 20 being cocked with respect to the vehicle 22. Sensor 46 is desirably attached to body 23 of vehicle 22 and does not move with door 24.

Door brake 40 is conveniently mounted on or associated with hinge 26 as a hinge brake. Door hinge brakes are well known in the art. While a hinge brake is useful it is not essential and any type of unit that can slow and/or temporarily stop outward movement of door 24 is useful. For example and not intended to be limiting, door brake 40 may be an electrically activated unit that applies a disk or band or drum brake to a rotating member coupled to hinge 26 so as to slow and/or stop further outward movement of door 24. A further alternative employs an arc-shaped piece or a hinged linkage coupled to the door that moves out and in as the door opens and closes, passing between braking pads which can slow and/or stop further movement of the door by clamping the piece with electrically actuated brake pads. A still further example is an over-run clutch type of unit coupled to the hinge or the door or elsewhere and having a pawl that can be engaged by controller 56. When the pawl engages the over-run clutch it stops further outward rotation of the door. But because the over-run clutch is unidirectional the door can swing inward or close without difficulty. Any suitable system for braking door movement may be used and are intended to be included in the present invention. It is preferable but not essential that the door braking action be unidirectional, that is, inhibiting or stopping outward movement when needed to prevent contact with the adjacent object, but not prevent inward movement to re-close the door. While electrical actuation of the braking mechanism is preferred, any means of doing so can be used. Non-limiting alternatives are hydraulic or pneumatic actuation or a combination there along with electrical actuation.

Figure 3:
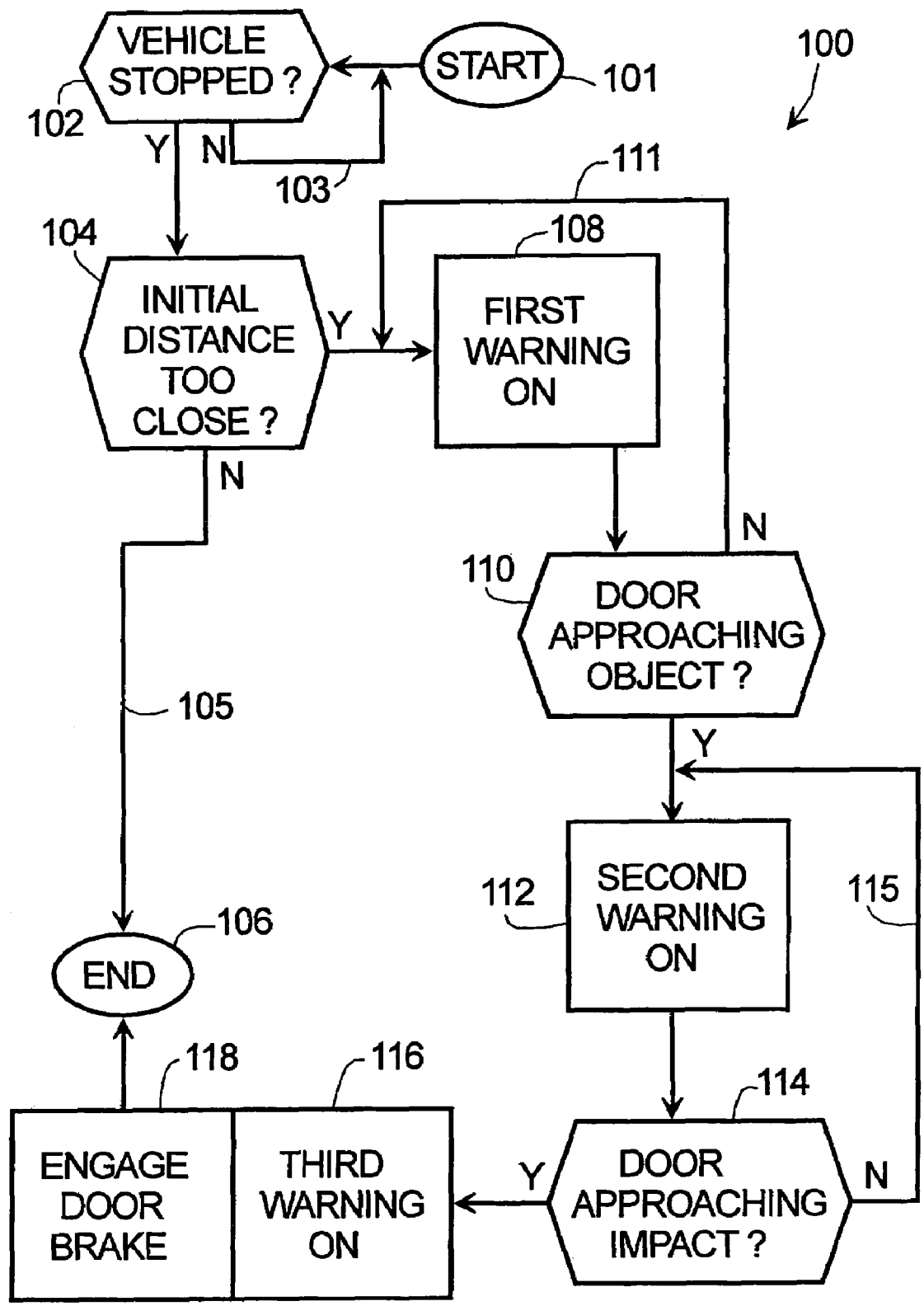
FIG. 3 is a simplified flow chart illustrating the method of the present invention according to a first embodiment.
Figure 4:
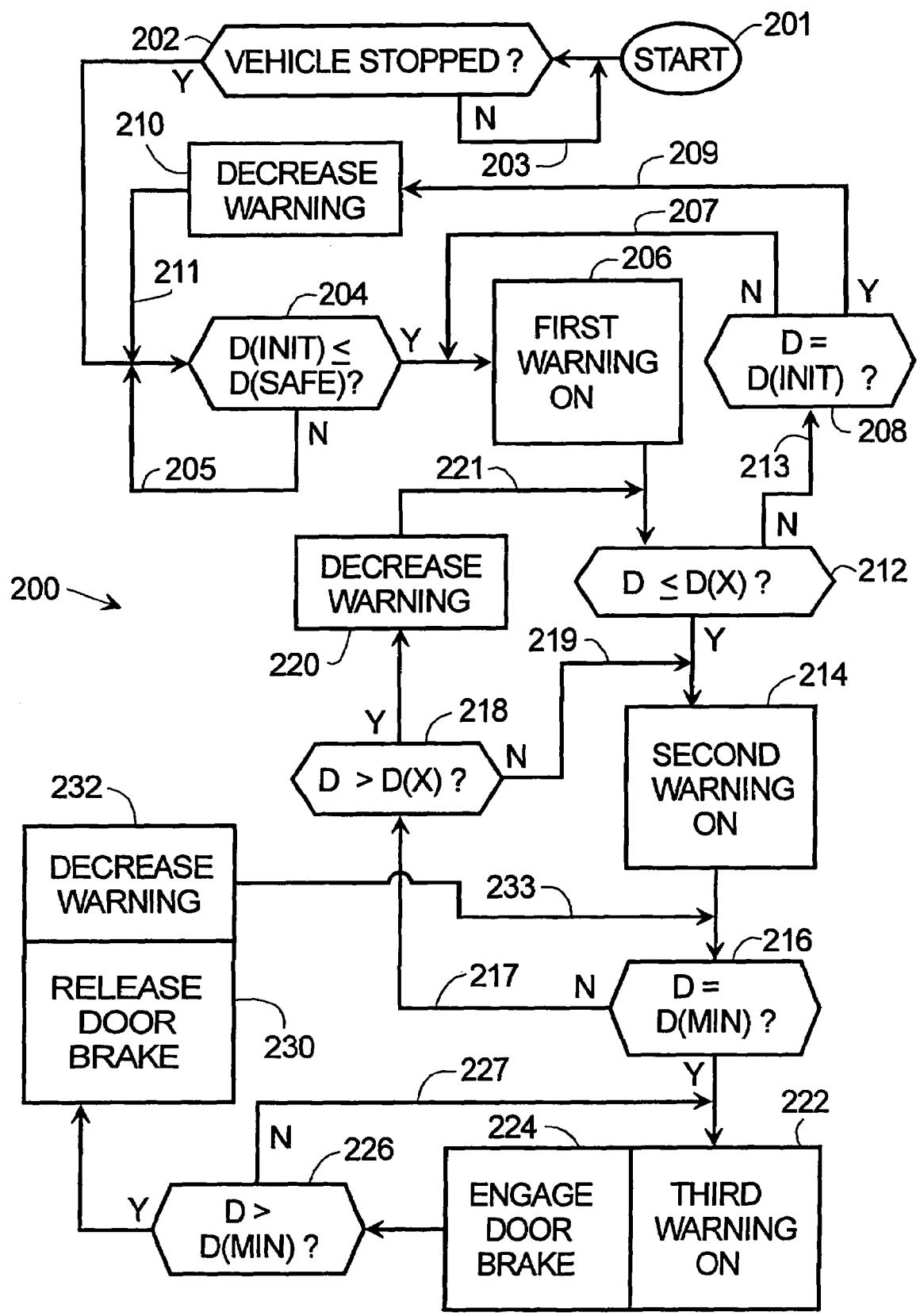
FIG. 4 is a simplified flow chart of the method of the present invention according to a second embodiment showing further details.

It is presumed in the discussion that follow, that system 50 through the cooperation of sensors 52 and controller 56 provides substantially continuous or frequently updated values of distance D between door 24 and adjacent object or vehicle 20, so that is unnecessary to expressly include "measure D" and/or "calculate D" steps in the methods of FIGS. 3-4, such steps being understood by persons of skill in the art based on the description herein. FIG. 3 is a simplified flow chart illustrating method 100 of the present invention according to a first embodiment. Method 100 begins with START 101, that desirably occurs when the ignition switch or other vehicle enabling device is turned on, or each time the vehicle stops or the door closes or a combination thereof. Method 100 then causes controller 56 operating in conjunction with sensor(s) 60 to execute VEHICLE STOPPED ? query 102. If the outcome of query 102 is NO (FALSE) then method 100 returns to START 101 as shown by path 103. If the outcome of query 102 is YES (TRUE), then controller 56 in combination with sensors 52 executes INITIAL DISTANCE TOO CLOSE ? query 104 to determine whether or not the vehicle is initially too close to another object, as for example, object or vehicle 20 located alongside. Query 104 can be executed (see FIG. 1) by determining whether the product of door length 30 and the cosine of the maximum value (door open all the way) of angle 28 equals or exceeds distance 47 (or distance 44 measured with door 24 still closed). The variable "D" is used herein to represent distance 44 between door edge 32 and adjacent object or vehicle 20. Thus, D can vary from D=D(INIT), the initial value with door 24 closed, to D=D(MIN), the minimum predetermined value just before a door bump takes place.

If the outcome of query 104 is NO (FALSE) then method 100 proceeds to END 106 as shown by path 105. If the outcome of query 104 is YES (TRUE) indicating that a door bump is possible, then method 100 proceeds to FIRST WARNING ON step 108 wherein controller 56 operating in conjunction with warning system 48 causes a first level warning to be turned on to alert the driver to a potential door bump risk. For example, and not intended to be limiting, controller 56 can cause visual display unit 482 in the field of view of the driver to flash a cautionary message with an appropriate color and repetition rate. Other warnings can also be given, for example and not intended to be limiting, audible warning unit 481 can be used to sound a buzzer or tone or speak, for example, "Be careful when you open your door. There is another object close by." or give other audible warning, as may be desired by the system designer and/or user. In the preferred embodiment, the first warning is merely visual but this is not essential. Recorded messages such as that illustrated above can be digitally stored in memory 62 associated with controller 56 or elsewhere in the vehicle electronic system.

Following step 108, method 100 causes controller 56 acting in cooperation with sensors 52 to execute DOOR APPROACHING OBJECT ? query 110 to determine whether or not the door is approaching the nearby object. For example this can be done by comparing the current value for distance 44 with previous values, i.e., is distance 44 getting smaller, or alternatively, is angle 28 getting bigger, or both. If the result of query 110 is NO (FALSE) then method 100 returns to step 108 as shown by path 111, leaving the first warning on. If the outcome of query 110 is YES (TRUE), then method 112 advances to SECOND WARNING ON step 112 wherein the warning level is increased. It is desirable (but not essential) that the first warning, whether audible or visual, is continued and an additional warning added. Suppose for example, that the first warning is a flashing light or visual message via visual alarm unit 482, then the second warning would desirably add an audible warning indication (buzzer, tone, voice) using audible warning unit 481, or vice versa. The combination of controller 56 and sensor(s) 52 then executes DOOR APPROACHING IMPACT ? query 114. If the outcome of query 114 is NO (FALSE) then method 100 returns to step 112 as shown by path 115. If the outcome of query 114 is YES (TRUE), then method 100 causes the combination of controller 56, warning system 48 and door brake 40 to execute THIRD WARNING ON step 116 and ENGAGE DOOR BRAKE step 118, in either order. In step 116, a still more urgent condition is announced by warning unit 48. For example and not intended to be limiting, the audible warning tone or buzzer or voice can be increased in volume or begin warbling or speak a difference message (e.g., "Watch out! Watch out! Door bump imminent on the left/right!", etc.). Similarly, the visual indication can change color (e.g., yellow or orange to red) or begin flashing more brightly and more urgently, or a combination thereof. Or, system 50 can provide a combination of increased audible and visual effects to alert the driver that a door bump is imminent.

In step 118, system 50 engages door brake 40 by sending an appropriate signal along leads or bus 41 from controller 56. Engaging door brake 40 desirably prevents the driver from pushing the door open the last small distance D(MIN) where it will bump the adjacent vehicle or object. This last small distance D(MIN) at which the door brake is engaged in step 118 is conveniently in the range of about 1 to 30 cm, better in the range of about 1 to 15 cm and preferable in the range of about 1 to 2 cm. D(MIN) is the value of distance 44 at which controller 56 causes door brake 40 to engage, thereby halting or significantly inhibiting further swing-out of door 24. D(MIN) is conveniently stored in memory in controller 56 or elsewhere in the vehicle's electronic system accessible to controller 56. While it is desirable that door brake 40 halt further swing-out of door 24 at D(MIN), this is not essential. Door brake 40 may act to gradually apply greater and greater braking action as D(MIN) is approached so that the swing-out velocity of door 24 is reduced to near zero by the time distance 44 approaches D(MIN). It is desirable that the maximum braking force be applied to halt door 24 before distance 44 reaches zero so that a door bang is avoided. Either sudden or gradual application of door brake 40 is useful. By accessing sensor 523, system 50 can determined when the driver pulls the door inward and thereafter release brake 40. Or, if brake 40 employs an over-run type clutch brake, door 24 can swing closed without further action by controller 56. Following step 118, method 100 goes to END 106. Method 100 desirably repeats each time door 24 is closed or vehicle 22 stops or starts.

FIG. 4 is a simplified flow chart of method 200 of the present invention according to a further embodiment and showing further details. Where the same or similar steps occur as in FIG. 3, such steps are identified. Method 200 is preferably executed by system 50 of FIG. 2, but other electronic processing systems within the car may also be used. For convenience of explanation, references to which portions of system 50 perform which steps is omitted in the description of FIG. 4 since this is covered sufficiently in connection with FIG. 3 so that persons of skill in the art will understand based on the description therein how such steps are executed by system 50. Method 200 begins with START 201 analogous to start 101 of FIG. 3 and under substantially the same conditions as START 100. Initial VEHICLE STOPPED ? query 202 is then executed wherein it is determined whether or not vehicle 22 is stopped. If the outcome of query 202 is NO (FALSE), then method 200 returns to start 201 in the same manner as method 100 of FIG. 3. If the outcome of query 202 is YES (TRUE) then method 200 proceeds to D(INIT)≦D(SAFE) query 204 analogous to query 104 wherein it is determined whether or not D(INIT), the initial value of D with door 24 still closed, is less than D(SAFE) defined as the distance from vehicle 22 to edge 32 of door 24 when door 24 is in its maximum open position absent object of vehicle 20. That is when angle 28 has its maximum possible value. D(SAFE) is a known constant for each vehicle door. If D(INIT)>D(SAFE), then adjacent vehicle or object 20 is far enough away that door 24 will not strike it when swung to its maximum open position. Thus, if the outcome of D(INIT)≦D(SAFE) query 204 is NO (FALSE), then method 200 loops back as shown by path 205. If the outcome of query 204 is YES (TRUE), then method 200 proceeds to FIRST WARNING STEP 206 analogous to step 108, wherein a first warning is given to the driver via warning system 48 as described in connection with step 108. Following step 206, method 200 advances to D<D(X) query 212 generally analogous to step 110. The value D(X) lies between D(MIN) and D(INIT), that is, D(MIN)<D(X)<D(INIT) and can be chosen by the system designer to suit the characteristics of a particular vehicle or can be made dependent upon the particular situation of vehicle 22. In a preferred embodiment, D(X) is set to about one-half of D(INIT), but larger or smaller values can also be used. Setting D(X)=(D(INIT))/2 causes subsequent SECOND WARNING ON step 214 (analogous to step 112) to occur when door 24 is about half way to bump into object or vehicle 20, but other criteria can also be used. If the outcome of query 212 is NO (FALSE), then method 200 loops back to D=D(INIT) ? query 208 (has the door re-closed?) as shown by path 213. If the outcome of query 208 is NO (FALSE) then method 200 loops back to step 206 as shown by path 207. If the outcome of query 208 is YES (TRUE), indicating that door 24 is once again closed (D has returned to its initial value) then method 200 advances to DECREASE WARNING step 210 wherein the first warning level is turned off and method 200 returns to query 204 as shown by path 211. If the outcome of query 204 is still YES (TRUE), then the first warning level is turned back on in step 206, as before. If door 24 is never opened further so that D<D(X) does not occur, then method 200 will proceed around the loop 204, 206, 212, 208, 210 and the first warning level will turn on and off with every excursion around the loop. Where the loop execution time is rapid as is usually the case, the first warning will appear to be on substantially continuously as long as D(INIT)<D(SAFE).

Returning now to query 212, if the outcome of query 212 is YES (TRUE), then method 200 proceeds to SECOND WARNING ON step 214 equivalent to step 112 of method 100, wherein the second level of driver warnings is turned on, as has been previously described in connection with step 112 of method FIG. 3. Following step 214, D=D(MIN) ? query 216 is executed, analogous to query 114 of FIG. 3. D=D(MIN) is the predetermined distance away from impact when it is desired that maximum door braking occur to try to avoid a door bump. If the outcome of query 216 is NO (FALSE) then method 200 loops back as shown by path 217 to D>D(X) ? query 218 wherein it is determined whether or not door 24 has closed sufficiently so that D is now greater than D(X). If the outcome of query 218 is NO (FALSE), then method 200 loops back to step 214 as shown by path 219. If the outcome of query 218 is YES (TRUE), then method 200 advances to DECREASE WARNING step 220 wherein the second warning is turned off, and thereafter loops back to step 212 as shown by path 221. When step 212 is repeated, if the outcome is NO (FALSE), for example because the driver has closed the door, then methods 200 returns to query 204 as previously described.

If the outcome of query 216 is YES (TRUE), then method 200 advances to THIRD WARNING ON step 222 (equivalent to step 116) and ENGAGE DOOR BRAKE step 224 (equivalent to step 118), which may be performed in either order. As previously discussed engaging door brake 40 substantially stops door 24 from opening further and therefore prevents a bump or at least slows door 24 sufficiently that a bump is unlikely to cause damage. Following steps 222, 224 method 200 advances to D>D(MIN) query 226 wherein it is determined whether the driver has begun or is trying to re-close door 24. If the outcome of query 226 is NO (FALSE) then method 200 loops back to steps 222, 224 as shown by path 227. If the outcome of query 226 is YES (TRUE) indicating that the driver is at least trying to re-close the door, then method 200 advances to RELEASE DOOR BRAKE step 230 and DECREASE WARNING step 232, which may be performed in any order. Sensor 523 in FIGS. 2 and 39 in FIG. 1 is provided to sense when the driver exerts a closing force on door 24 when a simple brake is being employed. When an over-run brake is being used, sensor 523, 39 is not generally needed since the door will close with little effort. DECREASE WARNING step 232, removes the third warning level established in step 222 and thereafter method 200 loops back to query 216 as shown by path 233. If for example, the driver has closed the door after feeling brake 40 engage, then method 100 loops back via steps 216, 218, 221, 212, 208, 210 to initial query 204, successively turning off each warning level. The first warning level may come back on depending on the outcome of query 204. Thus, method 200 automatically increases and reduces the warning levels as the driver moves the door open and closed so that the warning level is always appropriate to the position of the door relative to vehicle 20. Persons of skill in the art will understand based on the description herein that methods 100 and 200 apply to any vehicle door and any user of such door. The present invention also applies to doors on any other type of equipment, craft or structure that may be in proximity to an adjacent vehicle, craft, object or structure where door bumps are desired to be avoided. As used herein, the word "vehicle" whether singular or plural is intended to include such other crafts, objects, equipment or structures where there is a risk of door bumps.

While the foregoing description of the present invention is given in terms of a single-sided door swing inhibiting system, this is merely for convenience of explanation and persons of skill in the art will understand that multiple doors on either or both sides of the vehicle may be equipped with system 21, 50 of the present invention. Under those circumstances, controller 56 and warning system 48 are desirably shared, that is, used by all the doors equipped with sensors and door brakes, but this is not essential. Also, doors on the same side of the vehicle, can share body mounted distance sensor 46.

Further, returning to FIGS. 2-3, when DOOR APPROACHING OBJECT ? query 110 or D≦D(X) query 212 is executed and it is found that distance 44 is getting smaller but angle 28 remains unchanged, this is an indication that a person in adjacent vehicle 20 may be opening his or her door under circumstances (determined in initial query 104) where the initial distance is too close, that is D(INIT) <D(SAFE). Under these circumstances it is appropriate that system 50 provide an external warning to alert the other person to be careful by, for example, sounding horn 483. Other external warnings can also be used. The external warning may also be accompanied by an internal warning to alert the driver of vehicle 22 to the situation. Thus, the system of the present invention can not only warn the warn the user of the car equipped with the present invention that he or she has a risk of causing a door bump with an adjacent vehicle, but can also generate an alert or warning that a person in the adjacent car may be about to cause his or her door to bump the user's car. This is a significant advantage of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of providing a warning that a first vehicle may be bumped by a door of an adjacent second vehicle, comprising:

determining that the first vehicle is stopped;

measuring the distance D between opposed portions of the first and second vehicles;

measuring an angle of opening of a door of the first vehicle facing the second vehicle, and if the distance D is decreasing while the angle remains substantially constant; then energizing an alarm indicating that a door bump from the second vehicle may occur.

* * * * *